Figure 1:
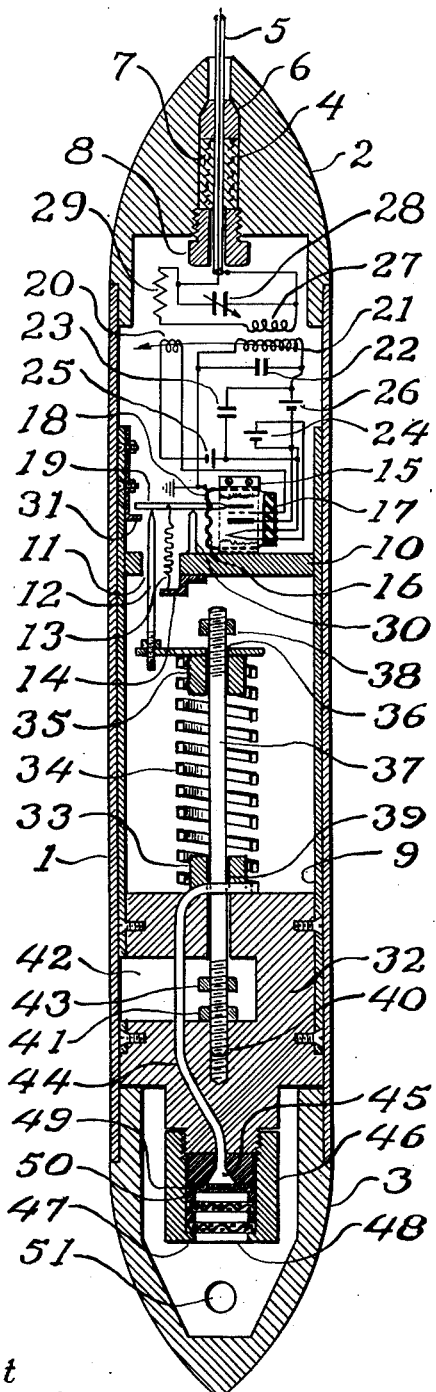

May 12, 1953  J. H. RAMSER  2,637,998
APPARATUS FOR DETERMINING WELL PRESSURES
Filed Nov. 14, 1946  2 Sheets—Sheet 1

Attest
John G. Butz

INVENTOR.
John H. Ramser
BY Norbert E. Birch
Attorney

May 12, 1953
J. H. RAMSER
2,637,998
APPARATUS FOR DETERMINING WELL PRESSURES
Filed Nov. 14, 1946
2 Sheets-Sheet 2
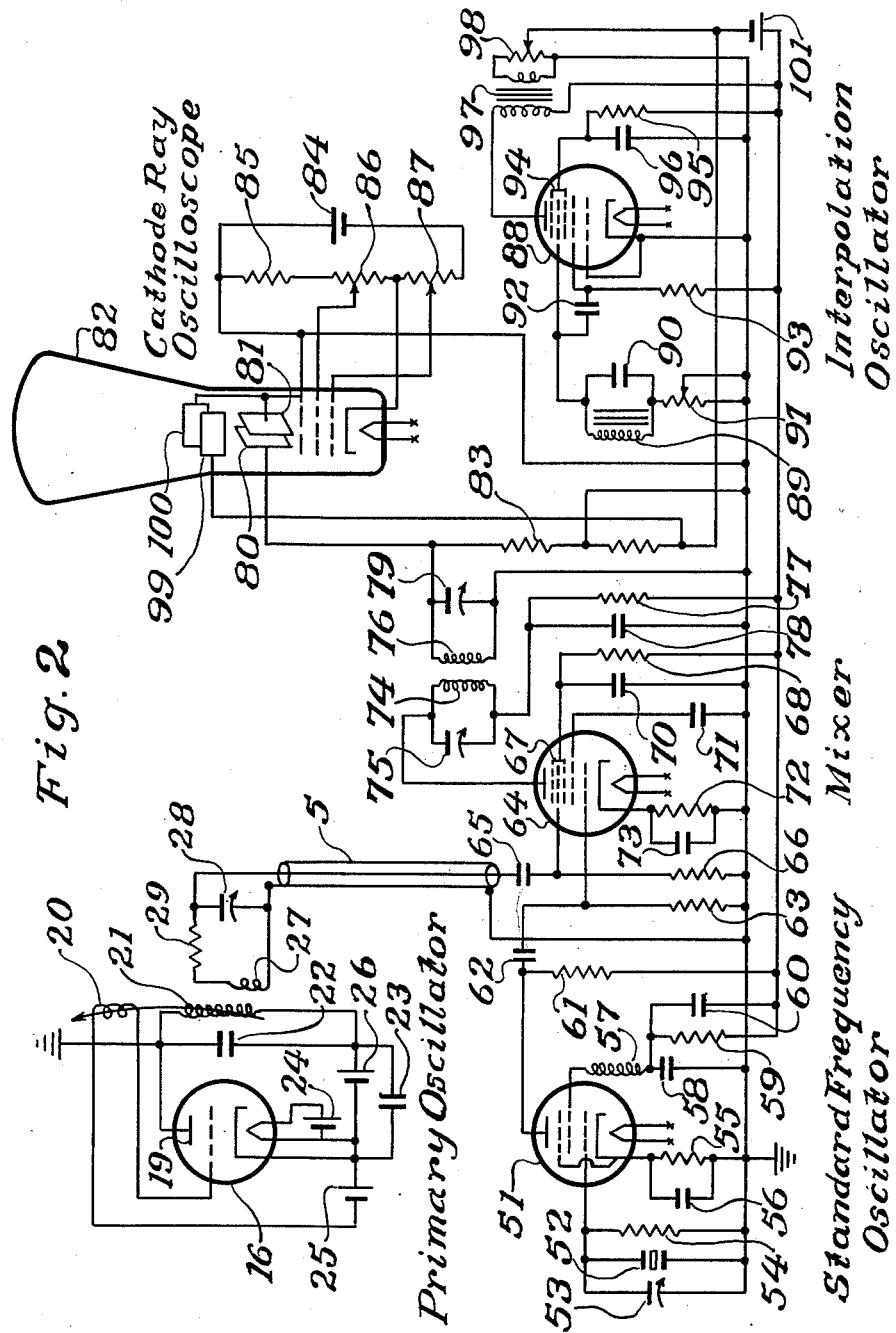
INVENTOR.
John H. Ramser
BY Norbert E. Birch
Attorney
Attest
John G. Buty

Patented May 12, 1953

2,637,998

UNITED STATES PATENT OFFICE 2,637,998

APPARATUS FOR DETERMINING WELL PRESSURES

John H. Ramser, Chester, Pa., assignor to The Atlantic Refining Company, Philadelphia, Pa., a corporation of Pennsylvania Application November 14, 1946, Serial No. 709,678

3 Claims. (Cl. 73—300)

The present invention relates to apparatus for determining fluid pressure, and more particularly fluid pressure at a depth in a well.

It is well known that the sensitivity and reliability of well pressure gages presently available are not sufficient for the proper solution of petroleum production problems, and especially those concerned with gas well production. The reason for this is the unavoidably high elastic hysteresis which is associated with the high elastic deformation necessary for mechanical stylus recording used in conventional "bottom hole" or well pressure gages. This elastic hysteresis may be separated into a time-independent "statical hysteresis" and a time-dependent "hereditary hysteresis." Both hysteresis effects, of which the second is larger and unpredictable, become relatively smaller when smaller deflections of the pressure-sensitive element such as a diaphragm, bellows, or Bourdon tube are used. These smaller deflections cannot be measured by a purely mechanical indicating system, such as a stylus recording on paper or metal. However, such small deflections may be easily and accurately determined by electrical methods such as are described hereinafter.

In accordance with the present invention, there is provided a well pressure gage with an elastic pressure-sensitive element of such dimensions and characteristics that its deflection or deformation under operating pressures is substantially smaller than that of conventional types. The elastic deformation of the pressure-sensitive element is measured using the principle of mechanical modulation of electron flow involving an oscillatory circuit including a triode having a movable anode. By mechanically connecting the movable anode with the pressure sensitive element, the deformation of the elastic element is translated into a corresponding small displacement of the anode, and thus the electron flow in the triode may be modified by pressure changes. The variation of electron flow and of the interelectrode capacitance is used as the controlling factor in an amplifier or an oscillator. Thus, when the triode is made part of an oscillatory circuit, the resonant frequency of this circuit varies in accordance with variations in fluid pressure. These frequency variations may be determined above ground, for example at the wellhead, by connecting the gage to the surface instruments with a suitable cable. Inasmuch as frequency changes can be measured with a high degree of accuracy, and since attenuation of power in the cable does not affect frequency, the apparatus is not only highly sensitive but is also highly reliable in the measurement of fluid pressures at a depth in a well.

The present invention may be further understood with reference to the accompanying drawings, in which Figure 1 represents, partly in cross section, the well gage including the triode and primary oscillatory circuit, and Figure 2 represents diagrammatically the primary oscillatory circuit and the circuits for translating frequency changes into a measure of pressure.

Referring to Figure 1, there is provided an elongated, cylindrical chamber or casing 1 having removable heads 2 and 3 affixed at the ends thereof. Head 2 is recessed at 4 to accommodate a metal-clad insulated cable 5 which serves to suspend casing 1 at the desired depth in a well, and at the same time to transmit electrical impulses to the surface instruments at the wellhead, as will be described in detail hereinafter. Cable 5 is rigidly affixed in head 2 by means of metal plug 6 attached to the cable, and by packing 7 held under compression by nut 8. Slidably fitted within chamber 1 is an inner sleeve or casing 9, which is held in position by means of machine screws or other conventional means not shown. Rigidly positioned in the upper portion of inner casing 9 is a horizontal partition 10 which is apertured at 11 to freely accommodate a vertical arm 12 and tension spring 13, one end of the spring being affixed to bracket 14 attached to the underside of partition 10. Attached to the upper side of partition 10 is a split collar 15 holding an electron tube such as a triode 16 having a metal shell or envelope, an insulating base 17, a flexible diaphragm 18 carrying a movable anode 19, and the conventional elements such as cathode, grid, and filament mounted upon base 17. The metal shell of the triode, as well as the movable anode 19 are grounded, the various tube elements being suitably connected in a primary oscillatory circuit including a tickler coil 20, inductance 21, capacitances 22 and 23, and batteries 24, 25, and 26. A parallel resonant circuit comprising coil 27, condenser 28, and resistor 29 is also provided in the upper section of chamber 1, such circuit being coupled with the surface instruments by means of the metal-clad insulated cable 5. Supported on the upper side of partition 10 is a fulcrum 30 functioning as a pivot for movable anode 19, and affixed to the inner surface of casing 9 is a stop 31 to limit the deflection of the anode under the tension of spring 13.

Disposed within the lower section of chamber 1 above head 3 is a body member 32 attached by screws or other means to the inner casing 9. Upon the upper face of body member 32 is provided a projection 33 surrounded by the lower section of a helical tube (Bourdon tube) 34. Upon the upper end of tube 34 is mounted a plug 35 having an offset shoulder to which is threadably attached the lower end of arm 12. The position of arm 12 with respect to the tube 34 and the movable anode 19 may be adjusted by advancing or retracting the arm through the threaded offset shoulder of plug 35. Plug 35 is axially recessed at 36 to slidably accommodate rod 37 bearing a nut 38 on the threaded upper end thereof. Rod 37 extends downwardly through the helical tube, thence through the recess 39 in projection 33 and body member 32, and is rigidly affixed in the body member by threads 40 and locknut 41. Access to the lower end of rod 37 is had through recess 42 in body member 32, whereby the rod may be projected or retracted by the application of rotational force to the nut 43 rigidly attached to rod 37. By adjusting the position of nut 38, or of rod 37 with respect to the body member 32, the amplitude of motion of the helical tube 34 may be controlled. The lower end of the helical tube 34 is rigidly connected to the body member 32, and an extension of the tube is carried through body member 32 as at 44, the lower end of the extension terminating in a funnel-shaped opening 45 in the lowermost face of the body member. Threadedly attached to the lower end of body member 32 is a collar 46 provided with shoulder 47, such collar being apertured at 48. A plurality of screens 49, separated from one another by ring members 50 are held in place beneath the opening 45 by means of collar 46, such screens serving to prevent ingress of solid particles from the well fluid into the opening 45 and the tube extension 44. The lower head 3 of chamber 1 is provided with an opening 51, whereby the well fluid may enter the head 3, and exert pressure upon the helical tube 34, and thus deform the tube as a function of the pressure. In lieu of using a system in which the helical tube is open to well fluid, a diaphragm or bellows may be substituted for the screens 49, and well fluid pressure may be transmitted to the helical tube through such diaphragm or bellows.

Figure 2 shows in detail the various circuits utilized in the practice of the present invention, the primary oscillator and parallel resonant circuit being disposed within the chamber 1 of the well gage, and the standard frequency oscillator, mixer, cathode ray oscilloscope, and interpolation oscillator being situated above ground adjacent the wellhead.

The object of the electrical system is to convert small displacements of the movable anode 19 of the primary oscillator into small changes of frequency of the primary oscillator, and to measure the frequency changes with a high degree of accuracy. This is accomplished by comparing the frequency of the primary oscillator with the constant frequency of the standard frequency oscillator. The difference of frequency between the primary oscillator and the standard is obtained by feeding both frequencies into a mixer, and obtaining as the output of the mixer, only the frequency difference. This difference is then measured by comparing it with the variable frequency output of a calibrated interpolation oscillator, the comparison being made in a cathode ray oscilloscope.

Referring to Figure 2, tube 51 is a "6F6" tube, which, together with its associated circuits, serves as a frequency standard, for example, at 100 kilocycles. The frequency is controlled by the piezo-electric crystal 52, with exact adjustment to 100 kc. by the trimmer condenser 53. Grid resistor 54 is required for oscillation (grid current) and resistor 55 is employed to bias the grid, while condenser 56 is a by-pass for the grid resistor. The output load of the tube 51 consists of a series combination of inductance 57 and condenser 58, which are tuned close to 100 kc. The screen-grid voltage is supplied over the dropping resistor 59, by-passed by condenser 60, while the plate voltage is supplied by dropping resistor 61. The oscillator is coupled by coupling condenser 62 and resistor 61 to the mixer tube 64, which may be a typical pentagrid converter, having a grid leak resistor 63.

The primary oscillator located in chamber 1 of the well gage comprises a triode 16 and its associated circuits whose frequency is close to 10 mc. The deviation from 10 mc. is determined by the position of the movable anode 19, since the frequency of a tuned-plate oscillator not only depends on the inductance 21 and capacitance 22, but also on the plate resistance $Rp$ and the total effective resistance R of the external circuit by the equation $$f = \frac{1}{2\pi\sqrt{LC}}\sqrt{\frac{R+Rp}{Rp}}$$

where $L$=inductance and $C$=capacitance. If power is drawn from the oscillator, the resistance coupled into the plate circuit is so large that the total effective resistance R cannot be neglected against $Rp$. If no power is drawn, R is small against $Rp$, so that $f$ depends substantially entirely on L and C. Since the plate resistance depends upon the position of the movable anode, then for constant L, C, and R, the frequency depends only on the position of the movable anode.

Feedback is provided by the tickler coil 20, which is inductively coupled to coil 21, while the plate voltage is supplied by battery 26, which is by-passed by condenser 23. Grid bias is furnished by battery 25, and filament current by battery 24. Power is drawn from the primary oscillator by the parallel resonant circuit comprising coil 27, condenser 28, and resistor 29. This circuit is coupled to the mixer tube 64 through cable 5 by means of coupling condenser 65 and resistor 66. Voltage is supplied to the electrostatic shield 67 by dropping resistor 68, by-passed by condenser 70. The second grid is grounded with respect to high frequency by condenser 71, and grid bias is furnished by resistor 72, by-passed by condenser 73. The parallel resonant circuit, composed of inductance 74 and condenser 75, is broadly tuned to the difference of frequency between the primary oscillator and the 10 mc. harmonic of the frequency standard. Therefore, only this difference frequency is coupled into the next stage by coil 76. Plate voltage is supplied to tube 64 through coil 74 and resistor 77, by-passed by condenser 78.

The voltage across the parallel resonant circuit comprising inductance 76 and condenser 79 is impressed on plates 80 and 81 of the cathode ray oscilloscope 82, the plates being shunted by resistor 83. The voltage to the various electrodes of the oscilloscope 82 is supplied by battery 84, the resistors 85, 86, and 87.

Tube 88 is a "6A7" tube, which, together with its associated circuits represents a low frequency oscillator or interpolation oscillator. Its frequency is determined by the parallel resonant circuit composed of inductance 89, condenser 90, and the variable resistor 91. By varying resistance at 91, the frequency can be changed from 1 to 5 times the frequency of the parallel tuned circuit 89—90 itself. Feedback is provided by the condenser 92, and the voltage of the second grid by dropping resistor 93. The voltage to the shield electrostatic 94 is supplied by resistor 95, by-passed by condenser 96. By means of the audio-transformer 97 and variable resistor 98, the frequency of the interpolation oscillator is impressed on plates 99 and 100 of the oscilloscope 82. The plate and screen-grid voltages to tubes 51, 64, and 88 are supplied by battery 101, but the batteries supplying filament current to tubes 51, 64, and 88 are not shown.

The measurement of the frequency $f$ of the primary oscillator, which is a function of pressure, may be made by adjusting the variable resistor 91 until a pattern such as a straight line, circle, or eclipse is obtained on the screen of the oscilloscope 82. The difference $f-f_0$ between the frequency $f$ of the primary oscillator and the frequency of the standard $f_0$ is equal to the frequency $f_1$ of the interpolation oscillator. $f_1$ is known from the calibration curve of the interpolation oscillator, therefore $f-f_0=f_1$ and $f=f_0+f_1$. From the calibration of the well gage, the pressure P is known as a function of the frequency $f$. When $f$ has been determined, as shown above, the pressure P can be obtained from $f$ and the calibration curve of the gage.

In operation, the well gage illustrated in Figure 1 is calibrated by introducing same into a pressure vessel in which the temperature and pressure of the medium surrounding the gage can be varied as desired. Since the temperatures and pressures encountered in a well, such as an oil or gas well, may range from 100° F. to 250° F. and 1000 to 6000 lbs. per square inch, it is necessary to calibrate the gage at various levels of temperature and pressure in order that the frequency or frequency change in the primary oscillator may be translated into terms of pressure. To this end, the frequency is determined for pressure intervals, for example, 500 lbs. per square inch within the range of 0 to 6000 lbs. per square inch at a plurality of desired temperatures, such as 100° F., 150° F., 200° F. and 250° F. By plotting these values, calibration curves may be obtained which permit direct translation of frequency into pressure at a given temperature. The temperature at various depths in the well whose pressure is to be determined, may be obtained by conventional methods, e. g., by lowering a maximum-minimum thermometer into the well to a known depth or by including such thermometer in the chamber of the well gage. Upon surfacing, the temperature may be read and the proper calibration curve is then used for translating frequency into pressure.

To obtain the pressure at a given depth in a well, the well gage with the anode 19 at zero position (primary oscillator at 10 mc. frequency) is lowered to the desired level by means of cable 5 and is held at such level until equilibrium is reached with respect to temperature. This may require from 30 to 60 minutes, and during this period, the well fluid enters the hole 51 in the lower head 3 and exerts pressure through the extension 44 upon the helical tube (Bourdon tube) 34. Under the influence of such pressure, the helical tube is distorted or deformed longitudinally and expands in an upward direction along the guide rod 37. This longitudinal movement is transmitted through the arm 12, the upper end of which presses against the outer end of movable anode 19 resting on fulcrum 30 and projecting into the triode 16 through the flexible diaphragm 18, the spring 13 exerting a downward tension on the outer end of anode 19, thus holding same in contact with the tip of arm 12. As the outer end of anode 19 is raised, the inner end is deflected downwardly toward the grid of the triode, thus increasing the frequency of the oscillatory current of the primary oscillator. The magnitude of the deflection of the movable anode is, of course, very small, i. e., of the order of thousandths of an inch, since it is an object of the invention to reduce hysteresis to the minimum. At such time as the gage attains equilibrium with respect to temperature and pressure, the new frequency of the primary oscillator, due to change in position of anode 19, becomes constant. This new frequency is transmitted through the parallel resonant circuit (inductance 27, condenser 28, and resistance 29) and cable 5 to the surface instruments, i. e., the mixer, standard frequency oscillator, etc. Since the parallel resonant circuit (inductance 74 and condenser 75) of the mixer is tuned to the difference of frequency between the primary oscillator and the 10 mc. harmonic of the standard, only this difference frequency is coupled into the cathode ray oscilloscope circuit via coil 76. The voltage across inductance 76 and condenser 79 is impressed upon plates 80 and 81 of the oscilloscope 82. By means of the audio-transformer 97 and variable resistor 98, the frequency of the interpolation oscillator is impressed on plates 99 and 100 of the oscilloscope 82. The measurement of the frequency of the primary oscillator, located at a depth in the well, is then made by adjusting the variable resistor 91 until a simple pattern is obtained on the screen of the oscilloscope 82, the frequency of the primary oscillator being a function of pressure. The difference between the frequency of the primary oscillator and the 10 mc. harmonic of the standard frequency oscillator is equal to the frequency of the interpolation oscillator, and the latter is known from the calibration curve of interpolation oscillator. Therefore, the frequency of the primary oscillator is equal to the sum of the frequencies of the standard frequency oscillator and of the interpolation oscillator. From the calibration of the gage, the pressure is known as a function of frequency. Since the new frequency of the primary oscillator has been determined as above described, the pressure can be obtained from the new frequency reading and the calibration curve of the gage.

While there has been described herein a preferred form of apparatus for carrying out the accurate measurement of pressures at a depth in a well, various modifications of such apparatus may be made without departing from the scope of the invention.

In lieu of employing only one helical tube 34 (Bourdon tube) for all pressures within the range of, for example, 1000 to 7000 lbs. per square inch, it may be desirable to use various tubes for the different pressure ranges within the broad range, for example, 1000 to 3000, 3000 to 5000, and 5000 to 7000 lbs. per square inch, in order to reduce mechanical hysteresis, and to increase sensitivity and accuracy of the gage. Also, depending on the amplitude of motion of the helical tube, it is possible to transmit such motion to the movable anode 19 through a system of levers in lieu of direct transmission by arm 12. Furthermore, if desired, the fulcrum 30 may be eliminated, and the anode may pivot at its point of junction with the flexible diaphragm 18. The triode 16, in lieu of being disposed horizontally with respect to the partition 10, may be mounted vertically, in which case the outer arm of anode 19 would be bent at right angles to its present position.

While the apparatus of the present invention is designed primarily for use in the measurement of pressures at a depth in a well, and if desired, may be left in the well without interfering with the production of well fluids such as oil, gas, or water, such apparatus may also be employed in the accurate measurement of pressure in pressure vessels, ocean depths, or at high altitudes.

I claim:

1. Apparatus for detecting fluid pressure in a well comprising a chamber adapted to be lowered into the well, an oscillatory circuit in the chamber including a triode, one element of said triode being movable with respect to the other elements and the frequency of oscillation of said circuit being variable in accordance with movement of said movable element, pressure responsive means located in said chamber and deformable in response to changes in fluid pressure, a contact arm secured to said pressure responsive means and adapted to move toward said movable element upon an increase in pressure on said pressure responsive means, means for adjusting the position of said contact arm with respect to said movable element to cause said contact arm to bear upon said movable element to change the position thereof when pressure upon said pressure responsive means is above a predetermined value and to remain out of contact with said movable element whenever pressure on said pressure responsive means is below said predetermined value, whereby the frequency of oscillation of said circuit will vary as a function of pressure on said pressure responsive means above said predetermined pressure and will remain constant during changes in pressure on said pressure responsive means below said predetermined pressure, and means for continuously determining said frequency of oscillation.

2. Apparatus for detecting fluid pressure in a well comprising a chamber adapted to be lowered into the well, an oscillatory circuit in the chamber including a triode, one element of said triode being movable with respect to the other elements and the frequency of oscillation of said circuit being variable in accordance with movement of said movable element, a helical Bourdon tube located in said chamber with its one end fixed and its other end adapted to move toward said movable element upon an increase in well pressure and away therefrom upon a decrease in well pressure, a contact arm secured to said other end of said Bourdon tube, means for adjusting the position of said contact arm with respect to said movable element to cause said contact arm to bear upon said movable element to change the position thereof when pressure upon said Bourdon tube is above a predetermined value and to remain out of contact with said movable element whenever pressure on said Bourdon tube is below said predetermined value, whereby the frequency of oscillation of said circuit will vary as a function of pressure on said pressure responsive means above said predetermined pressure and will remain constant during changes in pressure on said pressure responsive means below said predetermined pressure, and means for continuously determining said frequency of oscillation.

3. Apparatus for detecting fluid pressure in a well comprising a chamber adapted to be lowered into the well, an oscillatory circuit in the chamber including a triode, one element of said triode being movable with respect to the other elements and the frequency of oscillation of said circuit being variable in accordance with movement of said movable element, a helical Bourdon tube located in said chamber, said Bourdon tube being adapted to expand in length upon an increase in internal pressure and contract in length upon a decrease in internal pressure and having its one end fixed and its other end free to move toward said movable element upon expansion of said Bourdon tube and away from said movable element upon contraction of said Bourdon tube, means for exposing the interior of said Bourdon tube to well pressure, a contact arm secured to the free end of said Bourdon tube, means for adjusting the position of said contact arm with respect to said movable element to cause said contact arm to bear upon said movable element to change the position thereof when said Bourdon tube is expanded beyond a predetermined length, and to remain out of contact with said arm when said Bourdon tube is contracted to a length less than said predetermined length whereby the frequency of oscillation of said circuit will vary as a function of well pressure when said well pressure is above a predetermined value and will remain constant during changes in well pressure below said predetermined value, and means for continuously determining said frequency of oscillation.

JOHN H. RAMSER.

References Cited in the file of this patent

UNITED STATES PATENTS

| Number | Name | Date |
| --- | --- | --- |
| 1,837,222 | Kannenstine | Dec. 22, 1931 |
| 1,887,739 | Mott-Smith | Nov. 15, 1932 |
| 2,025,461 | Leonard, Jr. | Dec. 24, 1935 |
| 2,112,682 | Ryder | Mar. 29, 1938 |
| 2,155,419 | Gunn | Apr. 25, 1939 |
| 2,225,668 | Subkow et al. | Dec. 24, 1940 |
| 2,421,423 | Krasnow | June 3, 1947 |
| 2,455,021 | Rieber | Nov. 30, 1948 |